(12) United States Patent
Arnal et al.

(10) Patent No.: US 7,553,159 B1
(45) Date of Patent: Jun. 30, 2009

(54) ABDOMINOPELVIC REGION SURGICAL TRAINING MODEL

(75) Inventors: Kevin R. Arnal, Excelsior, MN (US); Sidney F. Hauschild, St. Paul, MN (US)

(73) Assignee: AMS Research Corporation, Minnetonka, MN (US)

( * ) Notice: Subject to any disclaimer, the term of this patent is extended or adjusted under 35 U.S.C. 154(b) by 526 days.

(21) Appl. No.: 11/461,952

(22) Filed: Aug. 2, 2006

Related U.S. Application Data

(60) Provisional application No. 60/747,112, filed on May 12, 2006.

(51) Int. Cl.
*G09B 23/28* (2006.01)

(52) U.S. Cl. ................................. 434/267; 434/272

(58) Field of Classification Search ............... 434/262, 434/267, 272, 273, 274, 275; 600/38
See application file for complete search history.

(56) References Cited

U.S. PATENT DOCUMENTS

| | | | | |
|---|---|---|---|---|
| 2,345,489 | A * | 3/1944 | Lord | 434/272 |
| 2,763,070 | A * | 9/1956 | McCormick | 434/273 |
| 3,213,550 | A * | 10/1965 | Kittner | 434/273 |
| 4,734,039 | A * | 3/1988 | Thompson | 434/274 |
| 5,061,187 | A * | 10/1991 | Jerath | 434/262 |
| 5,104,328 | A | 4/1992 | Lounsbury | |
| 5,356,295 | A | 10/1994 | Grosz | |
| 5,466,235 | A * | 11/1995 | Shubin, Sr. | 600/38 |
| 5,472,345 | A * | 12/1995 | Eggert | 434/273 |
| 5,518,407 | A * | 5/1996 | Greenfield et al. | 434/272 |
| 6,062,866 | A | 5/2000 | Prom | |
| 6,234,804 | B1 | 5/2001 | Yong | |
| 6,267,599 | B1 | 7/2001 | Bailey | |
| 6,336,812 | B1 | 1/2002 | Cooper et al. | |
| 6,382,214 | B1 | 5/2002 | Raz et al. | |
| 6,409,516 | B1 * | 6/2002 | Thill | 434/274 |
| 6,568,941 | B1 | 5/2003 | Goldstein | |
| 6,612,977 | B2 | 9/2003 | Staskin et al. | |
| 6,641,524 | B2 | 11/2003 | Kovac | |
| 6,652,450 | B2 | 11/2003 | Neisz et al. | |
| 6,780,016 | B1 | 8/2004 | Toly | |
| 7,465,168 | B2 * | 12/2008 | Allen et al. | 434/273 |
| 2003/0091967 | A1 * | 5/2003 | Chosack et al. | 434/262 |
| 2005/0043580 | A1 | 2/2005 | Watschke et al. | |
| 2005/0065395 | A1 | 3/2005 | Mellier | |

* cited by examiner

*Primary Examiner*—Kurt Fernstrom
(74) *Attorney, Agent, or Firm*—Jose' W. Jimenez; Kimberly K. Baxter; Gregory L. Koeller

(57) ABSTRACT

Surgical training models of the abdominopelvic region of male and female human patient's bodies to assist in training an operator in microsurgical techniques are disclosed. The surgical training models may be used in training in implantation of implantable medical devices, e.g., in the performance of surgical procedures using particular sling implantation tools to implant a urethral sling to support the urethra or bladder to treat incontinence.

16 Claims, 9 Drawing Sheets

ABDOMINOPELVIC REGION SURGICAL TRAINING MODEL

This application claims priority to U.S. Provisional Application No. 60/747,112, filed May 12, 2006, the entire content of which is incorporated herein by reference.

RELATED APPLICATION

This application is related to commonly assigned Provisional Application No. 60/704,563, filed Aug. 2, 2005, for ABDOMINOPELVIC REGION MALE ANATOMIC MODEL in the name of Adam Gullickson et al.

FIELD

The present invention pertains to a surgical training model of the abdominopelvic region of a human patient's body to assist in training an operator in implantation of implantable medical devices, e.g., in the performance of surgical procedures using particular sling implantation tools to implant a urethral sling to support the urethra or bladder to treat incontinence.

BACKGROUND

Models of the entire or particular regions or systems of the human anatomy are commonly employed in the general education and training of medical personnel as well as specialized training of specialists, surgeons, surgical staff, and other medical personnel in performance of specialized diagnostic, therapeutic, and surgical procedures. See, for example U.S. Pat. Nos. 5,104,328, 5,356,295, 6,062,866, 6,234,804, 6,267,599, 6,336,812, 6,568,941, and 6,780,016. Neonatal models of the developing fetus are provided to educate and inform prospective parents as disclosed in the above-referenced '295 and '328 patents. Models of the thoracic region and cardiovascular system are provided to educate cardiologists and surgeons as disclosed in the above-referenced '804, '599, '866, and '016 patents. In the above-referenced '941 patent, tactilely realistic, soft and pliant, models of the female breast encasing hard internal lesion models, and that may be transparent at least in part, are disclosed for needle biopsy training. A dynamic and accurate anatomical model of skin, muscle, bone, and ligaments of the human knee with a "true-to-life" feel is provided as the "Hillway Knee" by Hillway Surgical Ltd., Chichester UK, for simulated arthroscopic and open training procedures and to teach patients about to undergo knee surgery. A wide variety of simulations of regions and systems of the human body are disclosed in the above-referenced '812 patent. A housing is provided and multiple simulations of normal and abnormal internal organs and tissues of a body region of various degrees of complexity are provided to be selectively placed in the housing for training a surgeon, particularly in performing laparascopic procedures performed through the housing.

It is necessary to train surgeons and urologists in performing certain surgical procedures in the abdominopelvic region of the human body, particularly procedures for treating incontinence. Incontinence is a condition characterized by involuntary loss of urine, beyond the individual's control, that results in the loss or diminution of the ability to maintain the urethral sphincter closed as the bladder fills with urine. Male or female stress urinary incontinence (SUI) occurs when the patient is physically or emotionally stressed.

One cause for this condition is damage to the urethral sphincter or loss of support of the urethral sphincter, such as can occur in males after prostatectomy or following radiation treatment, or that can occur due to pelvic accidents and aging related deterioration of muscle and connective tissue supporting the urethra. Other causes of male incontinence include bladder instability, over-flowing incontinence and fistulas.

The female's natural support system for the urethra is a hammock-like supportive layer composed of endopelvic fascia, the anterior vaginal wall, and the arcus tendineus (a distal attachment to the pubic bone). Weakening and elongation of the pubourethral ligaments and the arcus tendineus fascia pelvis, weakening of the endopelvic fascia and pubourethral prolapse of the anterior vaginal wall, and their complex interaction with intraabdominal forces are all suspected to play a role in the loss of pelvic support for the urethra and subsequent hypermobility to an unnaturally low non-anatomic position, leading to urinary incontinence.

In general, continence is considered to be a function of urethral support and coaptation. For coaptation to successfully prevent or cure incontinence, the urethra must be supported and stabilized in its normal anatomic position. A number of surgical procedures and implantable medical devices have been developed over the years to provide urethral support and restore coaptation.

Females can also exhibit cystocele, a condition due to laxity of the pelvic floor wherein the bladder extrudes out and downwards causing SUI. The severity of this bladder collapse is rated between Grades one through four. In Grade four cystocele, the bladder extrudes out of the vaginal opening. The treatment of choice for this condition includes the reduction or closing of the pelvic floor opening from which the bladder descends using sutures. Further surgical procedures and implantable medical devices have been developed to correct cystocele by supporting the bladder.

The present application is directed to the training of surgeons and urologists in the treatment of SUI and chronic urinary incontinence due to inability of the urethral sphincter to close or remain closed as bladder fluid pressure builds through the implantation of implantable medical devices in the abdominopelvic region. Currently, incontinence treatments of choice involve implantation of a Kaufman Prosthesis, an artificial sphincter (such as the AMS-800 Urinary Control System available from American Medical Systems, Inc.), or a urethral sling procedure in which a urethral sling is inserted beneath the urethra and advanced in the retro pubic space, and perforating the abdominal fascia. Peripheral portions of the elongated urethral sling are affixed to bone or body tissue, and a central portion of the elongated urethral sling extends under the urethral or bladder neck to provide a platform that compresses the urethral sphincter, limits urethral distention, and pelvic drop, and thereby improves coaptation.

Male and female urethral sling procedures are disclosed in commonly assigned U.S. Pat. Nos. 6,382,214 and 6,652,450, for example, and further female urethral sling procedures are described in commonly assigned U.S. Pat. Nos. 6,641,524 and 6,612,977, for example, and publications and patents cited therein. The implantation of certain urethral slings involves the use of delivery systems configured for and techniques that involve transvaginal, transobturator, supra-pubic and pre-pubic exposures or pathways.

The above-referenced '214 patent describes apparatus and methods for treatment of male incontinence and female cystocele repair in which a urethral sling material is positioned between the descending pubic rami of the pubic bone. In such an operation a "hammock-like" urethral sling material is sutured below the urethra in males, or below the posterior bladder wall in the case of cystocele in females. The urethral sling material may comprise synthetic material or cadaveric or autologous fascia and may or may not be absorbable over time.

In the male case, the urethral sling applies passive compression against the bulbar urethra. The compression, either by itself or in conjunction with urethral mobility, prevents urine leak during strain. If additional passive pressure is required on the urethra after surgery is completed, collagen or other bulky material can be injected with a tiny needle through the perineum, causing more pressure created by the bulky material on one side (the lower or caudal side) by the urethral sling, and on the other (the upper or superior) side compressing the urethra.

In surgical approaches disclosed, for example, in commonly assigned U.S. Patent Application Publication Nos. 2005/0043580 and 2005/0065395, elongated self-fixating urethral slings are implanted for treating female prolapse employing a pair of sling implantation instruments or tools. The sling implantation tools comprise a handle with an elongated needle portion terminating in a needle distal end adapted to be coupled to free ends of the urethral sling and have mirror image right and left handed needle shapes. The sling implantation tools disclosed in the above-referenced 2005/0043580 publication have a curvature in a single plane and correspond generally to the BioArc™ SP and SPARC™ single use sling implantation tools sold by American Medical Systems, Inc., in a kit with an elongated urethral sling. The sling implantation tools disclosed in the above-referenced 2005/00653985 publication have a curvature in 3-dimensional space and correspond generally to the BioArc™ TO and MONARC™ TO single use sling implantation tools sold by American Medical Systems, Inc., in a kit with an elongated urethral sling. In each such sling implantation tool, the needle portion has a proximal straight portion extending from the handle and a distal shaped portion terminating in a needle distal end. The needle portion is sized and shaped so that the distal end may initially be moved through an abdominal incision and advanced posterior to one of the right and left posterior ischiopubic pubic ramus of the pelvic girdle spaced from the bladder to a vaginal incision in the region of the vaginal apex.

The needles of the BioArc™ TO and MONARC™ TO implantation tools are curved in three-dimensional space so that the needle tip may be advanced toward and through the obturator membrane of the obturator foramen, and then toward a vaginal incision in the region of the vaginal apex. The surgeon employs a learned wrist motion of the hand grasping the handle and pressure feedback felt through the handle to guide advancement. Also, the surgeon may palpate the vaginal wall with the fingers of the free hand to locate the needle tip and guide it toward and through the vaginal incision to expose the needle tip. The procedure is repeated using the other of the right and left hand sling implantation tools to advance the needle tip through a second skin incision and the other of the respective right and left obturator membranes to expose both needle tips through vaginal incisions.

In this way, right and left subcutaneous transobturator pathways are formed through the right and left obturator foramen and connective tissue attached to the right and left posterior ischiopubic pubic ramus of the pelvic girdle. This procedure is preformed without visualization of the needle tip, and care must be taken to avoid deviating posteriorly and penetrating the bladder and to otherwise avoid damaging any of the obturator nerves, the superficial epigastric vessel, the inferior epigastric vessel, the external iliac artery and the internal iliac artery.

The free ends of the elongated urethral slings are implanted through the pathway employing the right handed and left handed sling implantation tools as further described in the above-referenced. 2005/0043580 and 2005/0065395 publications. Generally speaking, the free ends of the elongated urethral slings are coupled to the needle distal ends, and portions of the sling are drawn through the pathways to draw a central sling portion against the urethra to provide support. The free ends of the elongated urethral slings include dilating connectors for connecting with the needle distal ends so that the pathways are dilated as the connectors are drawn through them. The dilating connectors are drawn out through the abdominal skin incisions and are severed from the urethral sling. The urethral sling portions other than the central portion may be covered with a detachable protective film sheath that is then withdrawn exposing mesh that is sutured to subcutaneous tissue layers. Chronic tissue ingrowth into the mesh pores stabilizes the urethral sling. A similar procedure may be possible to install an elongated urethral sling to support the male urethra to alleviate incontinence as described in regard to certain embodiments in the above-referenced '450 patent.

Typically, surgeons and urologists practice the right and left hand manipulations of the sling implantation tools to create the pathways and draw a urethral sling through them on cadavers before performing their first patient procedure. Cadavers are not always readily available for the initial training, and repeated training is not convenient. Moreover, it is not possible to visualize the advancement of the needle tip within the cadaver body, and it is not possible it assess whether damage has been done to internal organs, vessels, and nerves in the abdominopelvic region without destructive autopsy at the site.

Similar problems are encountered in training to perform other procedures involving blindly advancing a needle or other surgical instrument around the internal organs and alongside bones, nerves, and blood vessels to effect other treatments and implantations of implantable medical devices in the abdominopelvic region.

Consequently, it would be desirable to provide a realistic training model of the abdominopelvic region to facilitate training in the performance of these procedures and education of patients.

SUMMARY

The preferred embodiments of the present invention incorporate a number of inventive features that address the above-described problems that may be combined as illustrated by the preferred embodiments or advantageously separately employed.

In the following summary and description of the preferred embodiments of the training models of the present invention, components of the male and female abdominopelvic region may be referred to employing the anatomic terms that the components are fabricated to substantially realistically represent in normal or abnormal configurations as the training may require. Consequently, the non-biological representations of skin, visceral and connective tissues, membranes, blood vessels, nerves, skeletal bones, the urinary tract, rectum, and male and female sexual organs, may be referred to herein in anatomic terms for convenience.

In accordance with the present invention, a surgical training model of the abdominopelvic region of a human patient's body is provided to assist in training an operator in exploration of the internal structure of the region employing surgical instruments. In particular, human male and female surgical training models are provided.

In preferred embodiments, a surgical training model of the abdominopelvic region of a human patient's body is provided to assist in training an operator in directing minimally invasive surgical instruments through body tissue. The training model may comprise a relatively rigid skeletal frame, one or more body component model, and a mass of elastomer encasing the body component model and the skeletal frame having a flexibility, density and consistency mimicking that of tissues of the human body.

Preferably, the body component comprises at least one substantially anatomically correct model of a body organ, muscle group, membrane, ligament, blood vessel, or nerve in substantially correct anatomic shape, size and relation to the skeletal frame.

The skeletal frame may be shaped in conformance with at least a portion of the human pelvic girdle comprising at least portions of the right and left coxal bones each including a substantially realistic representation of at least the ischium and pubis, including the superior pubic ramus and the posterior ischiopubic pubic ramus joined at the interpubic disc, the skeletal frame defining right and left obturator foramens.

In one preferred embodiment, the training model is adapted for training in the manipulation and advancement of shaped needles of sling implantation tools or instruments, e.g., right handed and left handed sling implantation tools, between respective anterior right and left surgical skin incisions overlying the patient's right and left obturator foramen and respective right and left sites in a pelvic floor region to form a subcutaneous passage for the urethral sling transversely across a portion of the urethra to simulate normal pubourethral ligament support. The right and left handed sling implantation tools each comprising a handle and an elongated needle coupled at a needle proximal end to the handle and extending in a curvature through two-dimensional or three-dimensional space to a needle distal end.

In one exemplary embodiment, the surgical model preferably comprises a relatively rigid skeletal frame shaped in conformance with at least a portion of the human pelvic girdle comprising at least portions of the right and left coxal bones each including a substantially realistic representation of at least the ischium and pubis, including the superior pubic ramus and the posterior ischiopubic pubic ramus joined at the interpubic disc, the skeletal frame defining right and left obturator foramens. A penetrable membrane extends substantially across at least one of the right and left obturator foramens and having a membrane puncture resistance selected to mimic the puncture resistance of the native human obturator membrane to puncture by the needle distal end. A mass of elastomer representing the corpus in the abdominopelvic region encases the skeletal frame having an external shape substantially representative of the external appearance of the human abdominopelvic region. The mass may be subdivided into elastomers of differing density to include superficial features of posterior skin including subcutaneous layers and membranes. The elastomers are selected to present a resistance to passage of the elongated needle substantially corresponding to the resistance to passage of the elongated needle presented by the native human subcutaneous tissues and membranes in the abdominopelvic region adjacent the pelvic girdle. A tubular urethra model shaped to represent the urethra extending in substantially physiologic relation to the skeletal frame is disposed within the mass of elastomer.

In use, the surgical trainee is able to palpate the surgical model and practice manual advancement of the elongated needles of the right and left handed sling implantation tools from one of a selected simulated skin incision of the anterior skin surface and the body overlying the tubular urethra model through the respective right and left penetrable membranes and along the respective right and left posterior ischiopubic pubic ramus of the skeletal frame.

The mass of elastomer may be sufficiently transparent to enable viewing of the passage of the elongated needle therethrough. In a further preferred embodiment, the surgical training model further comprises an opaque cover adapted to be disposed over the mass of elastomer to selectively block viewing of the passage of the elongated needle therethrough.

In a still further preferred embodiment, the surgical training model comprises a number of organ, tract, muscle group, membrane, vessel, nerve, ligament and other anatomical components of the abdominopelvic region of male and female patients encased within the mass of elastomer.

In preferred embodiments, at least a bladder model shaped to represent a human bladder is disposed within the mass of elastomer in anatomically correct relation to the urethra model and the portion of the human pelvic girdle and disposed therefrom to enable passage of the elongated needle thereby to train in avoiding contact with or damage to the bladder.

The various embodiments may include at least one tubular member representing one or more of the obturator nerves and arteries, the superficial epigastric vessel, the inferior epigastric vessel, the external iliac artery and the internal iliac artery extending in substantially physiologic relation to the skeletal frame disposed within the mass of elastomer.

The rigid skeletal frame may further include a portion of the lumbar backbone and sacrum. The training model preferably includes realistic representations of tracts and organs including the male or female reproductive tract, bladder and urethra and optionally the bowel. Skin layers, soft tissues and fascia are preferably replicated in pliant, elastic and penetrable elastomers having a realistic density and consistency. The models of any of the tracts, organs, nerves and vessels that are presented may be tinted in colors visible through the modeled transparent skin and tissues.

In a further aspect of the present invention, a kit including selected medical instruments and the anatomic model may be provided for training in the use of the medical instruments.

This summary of the invention has been presented here simply to point out some of the ways that the invention overcomes difficulties presented in the prior art and to distinguish the invention from the prior art and is not intended to operate in any manner as a limitation on the interpretation of claims that are presented initially in the patent application and that are ultimately granted.

BRIEF DESCRIPTION OF THE DRAWINGS

These and other advantages and features of the present invention will be more readily understood from the following detailed description of the preferred embodiments thereof, when considered in conjunction with the drawings, in which like reference numerals indicate identical structures throughout the several views, and wherein.

DETAILED DESCRIPTION

In the following detailed description, references are made to illustrative embodiments of methods and apparatus for carrying out the invention. It is understood that other embodiments can be utilized without departing from the scope of the invention.

Figure 1:
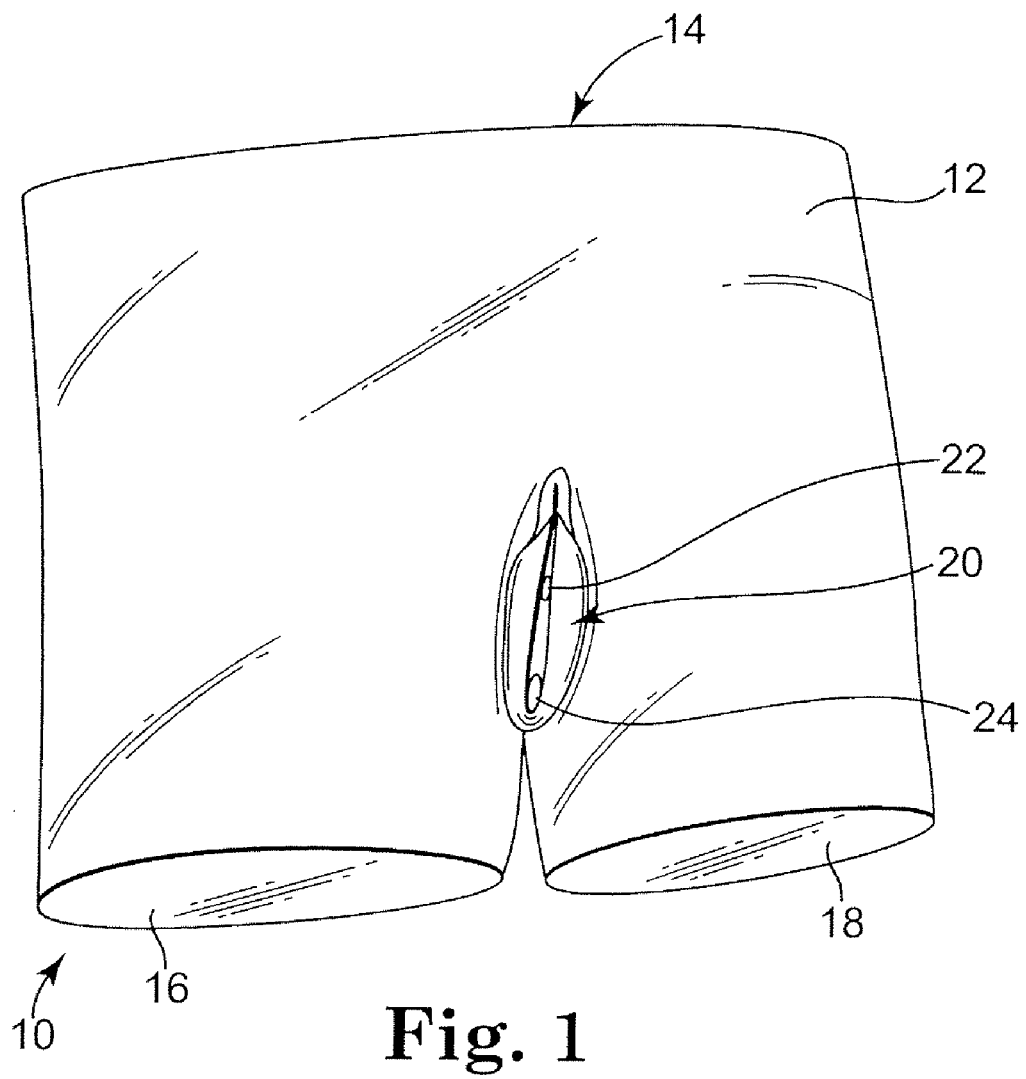
FIG. 1 is a perspective view of the exterior of a surgical training model of the female abdominopelvic region depicting the skin and the external genitals.

In FIG. 1, a first preferred embodiment of a female training model 10 of the female abdominopelvic region that is covered or bounded by a shell or "skin" 12 and that extends between a model abdominal end 14 and model leg ends 16 and 18. The skin 12 is shaped to conform to representative external genitalia 20, and the external genitalia model may represent the urethral orifice 22 and vaginal orifice 24. In one preferred embodiment, the urethral orifice 22 and vaginal orifice 24 are coupled to internal representations or models of the urethra 52 and vagina 54 (shown in FIG. 3). Furthermore, the external female genitalia 20 may be modeled to represent a vaginal incision made to expose a section of the urethra 52 (FIG. 3) between the urethral orifice 22 and the vaginal orifice 24 that the central support portion or hammock of the sling is to be placed in a transobturator or suprapubic sling implantation procedure as described above.

Figure 2:
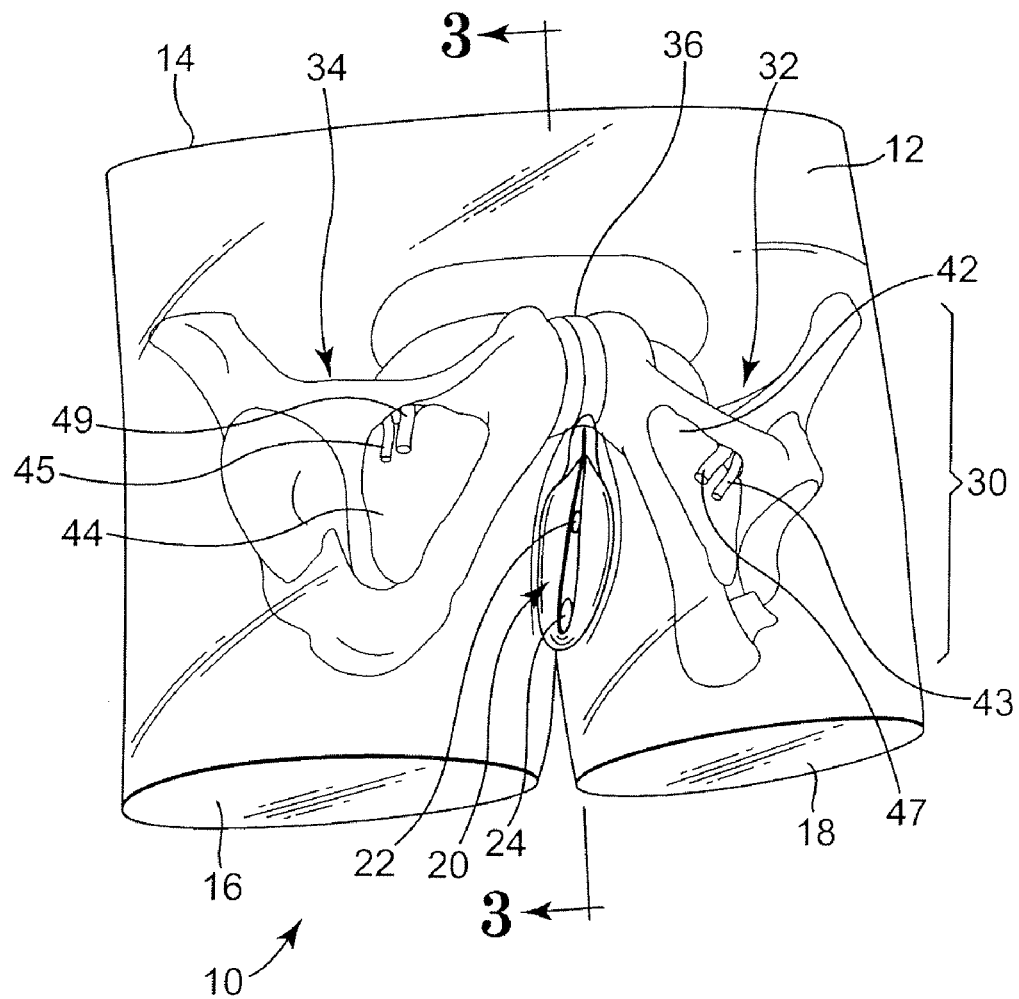
FIG. 2 is a perspective view of the interior of the surgical training model of FIG. 1 depicting the opaque bone models of the pelvic girdle and the obturator membrane models visible through the transparent skin and tissue model.

Turning to FIG. 2, certain of the internal components of the female training model 10 are depicted. In particular, the female training model 10 comprises at least a relatively rigid skeletal frame 30 that is shaped in conformance with at least a portion of the human pelvic girdle, particularly at portions of the right and left coxal bones. For example, the depicted frame 30 is shaped anatomically to represent the right and left coxal bones 32 and 34, each including a substantially realistic representation of at least the ischium and pubis, including the superior pubic pubic ramus and the posterior ischiopubic pubic ramus joined at the interpubic disc 36, the skeletal frame 30 defining right and left obturator foramens. Penetrable membranes 42 and 44 extend substantially across the right and left obturator foramens. The membranes 42 and 44 have a membrane puncture resistance selected to mimic the puncture resistance of the native human obturator membrane to puncture by a needle distal end.

Figure 4:
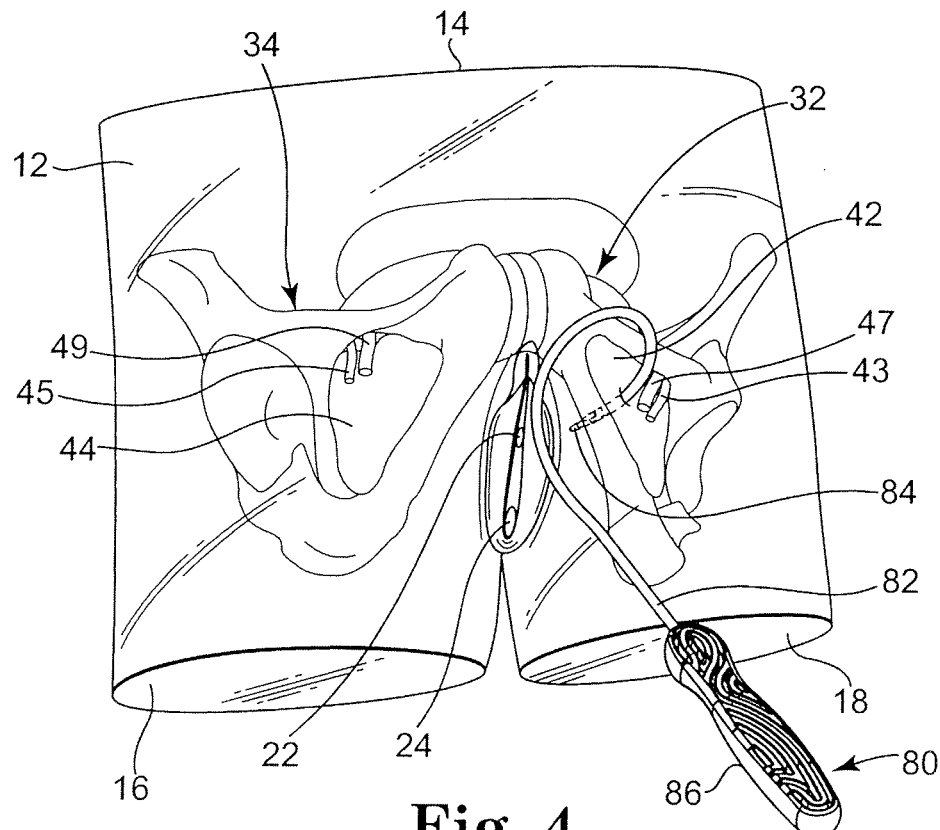
FIGS. 4 and 5 are perspective views of steps in the passage of helical needles of sling implantation tools through the external skin of the surgical training model around pubic bones and through transobturator membranes to dispose the needle tip through the vaginal skin.
Figure 5:
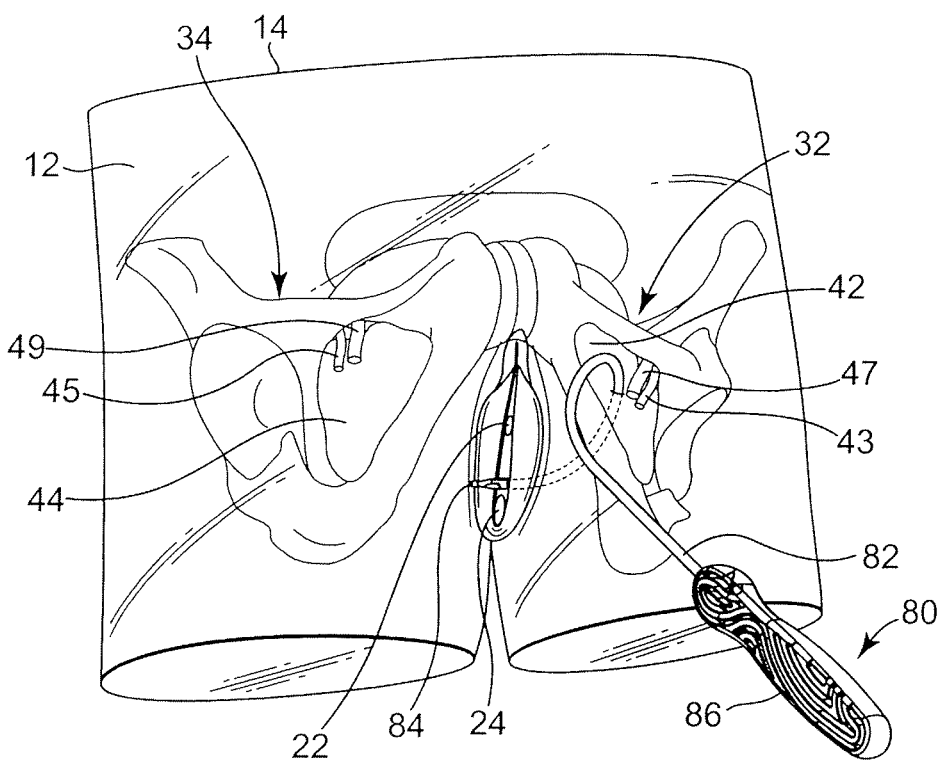

Preferably, tubular models of at least a segment of the transobturator nerves 43 and 45 are included in the female surgical model 10 as shown in FIGS. 4 and 5. The transobturator nerves 43 and 45 pass through the respective transobturator membranes 42 and 44 that extend along the lateral pelvic walls across the obturator foramen of the right and left coxal bones 30 and 32 branching into nerve branches (not shown) into the right and left adductor muscle groups. In a preferred embodiment, the segments of the transobturator nerves 43 and 45 that could be injured by poor placement of instrument needles are modeled in distinct tints that can be seen by the trainee. More complete models of the transobturator nerves 43 and 47 extending to the leg ends 16 and 18 could be included in the surgical training 10.

Similarly, tubular models of at least segments of the transobturator arteries 47 and 49 are included in the female surgical model 10 as shown at least in part in FIGS. 4 and 5. The transobturator arteries 47 and 49 pass through the respective transobturator membranes 42 and 44 that extend along the lateral pelvic walls across the obturator foramen of the right and left coxal bones 30 and 32 branching into arterial branches (not shown) into the right and left adductor muscle groups. In a preferred embodiment, the segments of the transobturator arteries 47 and 49 that could be injured by poor placement of instrument needles are modeled in distinct tints that can be seen by the trainee. More complete models of the transobturator arteries 47 and 49 extending to the leg ends 16 and 18 could be included in the surgical training 10.

Figure 3:
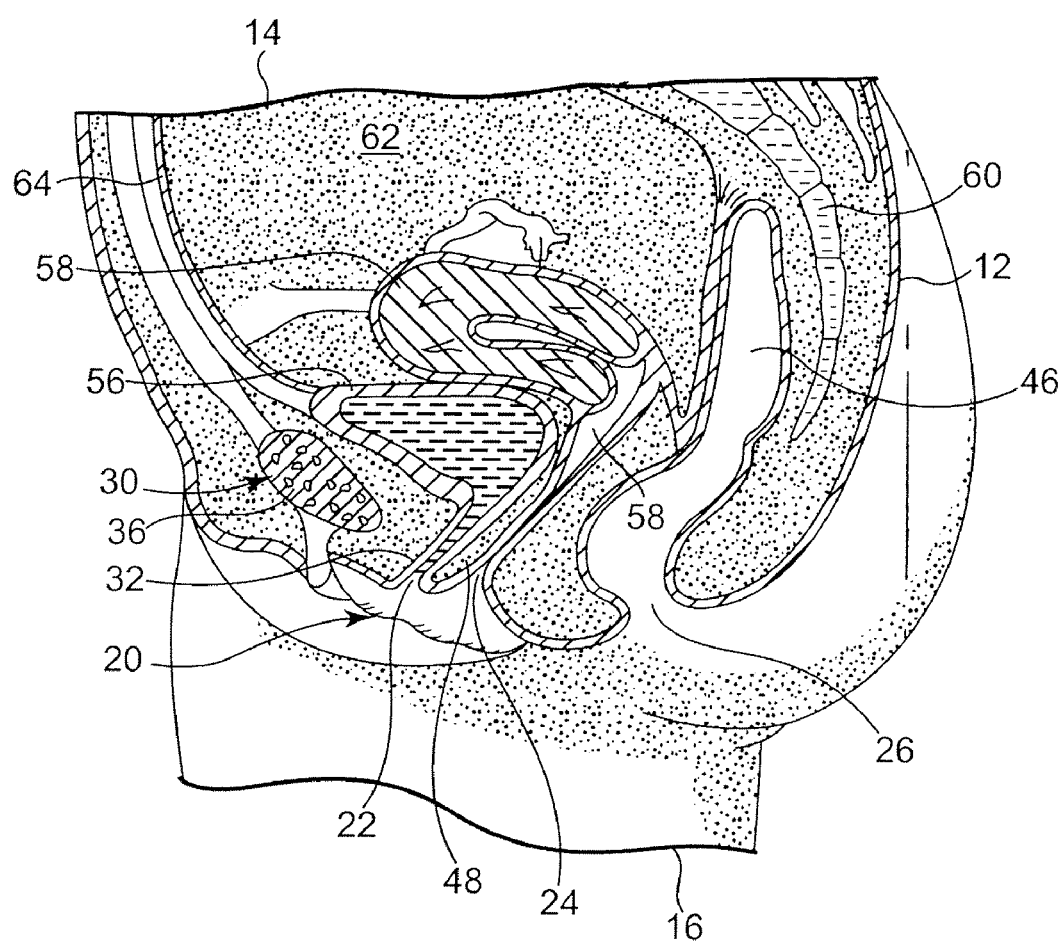
FIG. 3 is a cross-section view taken along the lines 3-3 of FIG. 2 depicting opaque anatomic models of the internal components of the training model of FIGS. 1 and 2.

Referring to FIG. 3, the rigid skeletal frame 30 may further include a portion of the lumbar backbone and sacrum 60 that may be coupled via models of the right and left ilium (if provided) of the right and left coxal bones 32 and 34. The female training model 10 preferably also includes realistic representations or models of the tracts and organs located within the human abdominopelvic region and disposed, in the training model 10, in correct anatomic relation to the rigid skeletal frame 30.

In particular, at least models of the bladder 56 and the urethra 52 are incorporated into the training model 10. The bladder 56 is disposed posterior to the right and left coxal bones 32 and 34, and the urethra 52 extends between the urethral opening 22 and the bladder 56. The model of the urethra 52 may comprise a polymer tube that is tinted to a particular color and embedded within a transparent elastomer. The bladder 56 may also be formed of a tinted polymer and is displaced from posterior surfaces of the right and left coxal bones 32 and 34 to enable passage of a needle as described further below.

In addition, the female training model 10 preferably comprises an internally disposed model of the vagina 54 formed of an elastomer or polymer tinted to exhibit a color differing from the tint color of the bladder 56 and the urethra 52. The vagina 54 extends from the vaginal orifice 24 in correct anatomic relation to the urethra 52, and the training model may include an internally disposed model of the uterus 58 coupled with the model of the vagina 54. As noted above, an incision may be modeled between the vaginal tract and the urethra 52 to expose the space where a support portion of a urethral sling is to be disposed.

In this regard, the female training model 10 may be configured such that about 20 percent of the length of the urethra 52 extending from its junction with the bladder 56 corresponds anatomically to the urethra-vesical junction or bladder neck in a healthy human female. About 20 percent of the length of the urethra 52 extends inward from the urethral orifice 22, and a urethral or urinary sphincter is located in the intermediate 60 percent of the length of the urethra 52. Support of the urethral sphincter and its sphincteric mechanism through the implantation of a urethral sling of the types described above is of key importance for maintaining or restoring female continence. Consequently, the female training model 10 may include a representation of an incision at 48 (FIG. 3) exposing the intermediate length of the urethra 52 for training purposes.

The female training model 10 may also include an internally disposed component model of the bowel 46, which may be formed of a polymer and tinted to exhibit a further distinct color, extending to an anal opening 26. In addition, the female training model 10 may incorporate component models of other tracts, ligaments, connective tissue, membranes, nerves, and blood vessels that are each tinted to exhibit further distinct colors. For example, it may be desirable to incorporate representations of one or more of the obturator nerves, the superficial epigastric vessel, the inferior epigastric vessel, the external iliac artery and the internal iliac artery extending in substantially physiologic relation to the skeletal frame 30 disposed within the mass of elastomer 62.

The remaining void within the skin 12 of the female training model 10 that would be occupied by tissues and the lower digestive tract may be filled with an elastomer mass 62 (FIG. 3) that is preferably transparent. The model urethra 52 is disposed within the elastomer mass 62 at region 48 thereby separating the urethral 52 from the vagina 58. An anatomically correct peritoneal layer or peritoneum 64 preferably encases at least a portion of the elastomer mass 62 representing the lower digestive tract. Optionally, the skin 12 of the female training model 10 may comprise layers of fabric reinforced polymers or polymer sheets of differing density to mimic characteristics of human skin, a subcutaneous fat layer, and/or an anterior rectus sheath layer, and/or a muscle layer, and/or a posterior rectus sheath layer, and/or an extraperitoneal layer over the peritoneum 64. Optionally, the female training model 10 may include representative models of ligaments, fascia, and connective tissues supporting the organs and tracts.

The above described components are preferably replicated in pliant, elastic and penetrable elastomers having a realistic density, consistency, and "feel" as the corresponding human female body. The models of any of the tracts, organs, nerves and vessels that are presented may be colored in colors visible through the modeled transparent skin 12, peritoneum 64, and mass 62. The hard bone structures of the skeletal frame 30 are preferably opaque and visible through the transparent skin 12, peritoneum 64, and mass 62.

Thus, the external shape of the female training model 10 is substantially representative of the external appearance of the human female abdominopelvic region including superficial features of posterior skin overlying the pubis and the body overlying the tubular urethra 52. The elastomers of the skin 12 and the underlying tissues and mass 62 are selected to present a resistance to puncture and passage of an elongated medical or surgical instrument, e.g., the needle of a sling implantation tool of the types described herein, substantially corresponding to the resistance encountered in passing the same through the corresponding structures of the human body in the abdominopelvic region adjacent the pelvic girdle.

Exemplary transparent polymer materials that may be employed to fabricate the skin 12 (and any subcutaneous layers underlying the skin surface) and the mass 62 may be selected from among transparent or translucent plastisol, natural rubber, neoprene (synthetic latex), e.g., the materials denoted DS-300 (soft, flesh-colored), DS-302 (soft clear) and DS-303 (harder clear) from California Medical Innovations, Pomona, Calif. The more rigid, opaque, skeletal components may be formed of any suitable rigid plastic employed to make the corresponding skeletal anatomic models. The remaining components may be molded to proper shape and scale from polymers having an intermediate degree of flexibility and tinted to differentiate visually one from the other through the transparent skin 12 and mass 62.

In use, the surgical trainee is able to palpate the female training model 10 and practice manual advancement of the elongated medical or surgical instruments. In preferred embodiments, the elongated medical or surgical instruments may comprise right and left handed sling implantation tools having elongated needles that are advanced from one of a selected simulated skin incision of the anterior skin surface overlying the tubular urethra 52 and passed through the respective right and left penetrable membranes 42 an 44 in any of the ways described above. For example, FIGS. 4 and 5 depict steps in the passage of a helical needle 82 of a right hand sling implantation tool 80 through the external skin 12 of the female training model 10 around the pubic bone 32 and through the transobturator membrane 42 to dispose the needle tip 84 through the vaginal skin or at the site and form a right hand sling pathway. A similar procedure is practiced employing a left hand sling implantation tool to form a left hand sling pathway around the pubic bone 34 and through the transobturator membrane 44. This transobturator (TO) approach can be practiced employing the above-described BioArc™ TO and MONARC™ TO implantation tools. The training model and medical or surgical instruments may be supplied together as a training kit.

In reference to FIGS. 4 and 5, the needle 82 is sized and shaped so that the distal end 84 may initially be moved through an abdominal incision and advanced posterior to one of the right and left posterior ischiopubic pubic ramus of the pelvic girdle spaced from the bladder 56. The needle 82 is curved in three-dimensional space so that the needle tip 84 may be advanced toward and through the obturator membrane 42 of the obturator foramen, and then toward a vaginal incision exposing the region 48 of FIG. 3.

In this procedure, the surgeon employs a learned wrist motion of the hand grasping the handle 86 and pressure feedback felt through the handle 86 to guide such advancement while avoiding damage to the bladder 56 and any blood vessel or nerve in the path of advancement. The surgeon may palpate the vaginal wall with the fingers of the free hand to locate the needle tip 84 and guide it toward and through the vaginal incision to expose the needle tip 84 as shown in FIG. 5. The procedure is repeated using the other of the right and left hand sling implantation tools to advance the needle tip through a second skin incision and the other of the respective right and left obturator membranes 42 and 44 to expose both needle tips through or at the vaginal incision.

Then, the surgeon in training may attach a urethral sling to the needle free ends and reverse the motion of the needles, e.g., needle 82, to pull the sling ends through the pathways and out of the skin incisions in the skin 12. The remaining implantation steps described above and in the above-referenced commonly assigned patents and patent applications may be practiced employing the training model 10.

Figure 6:
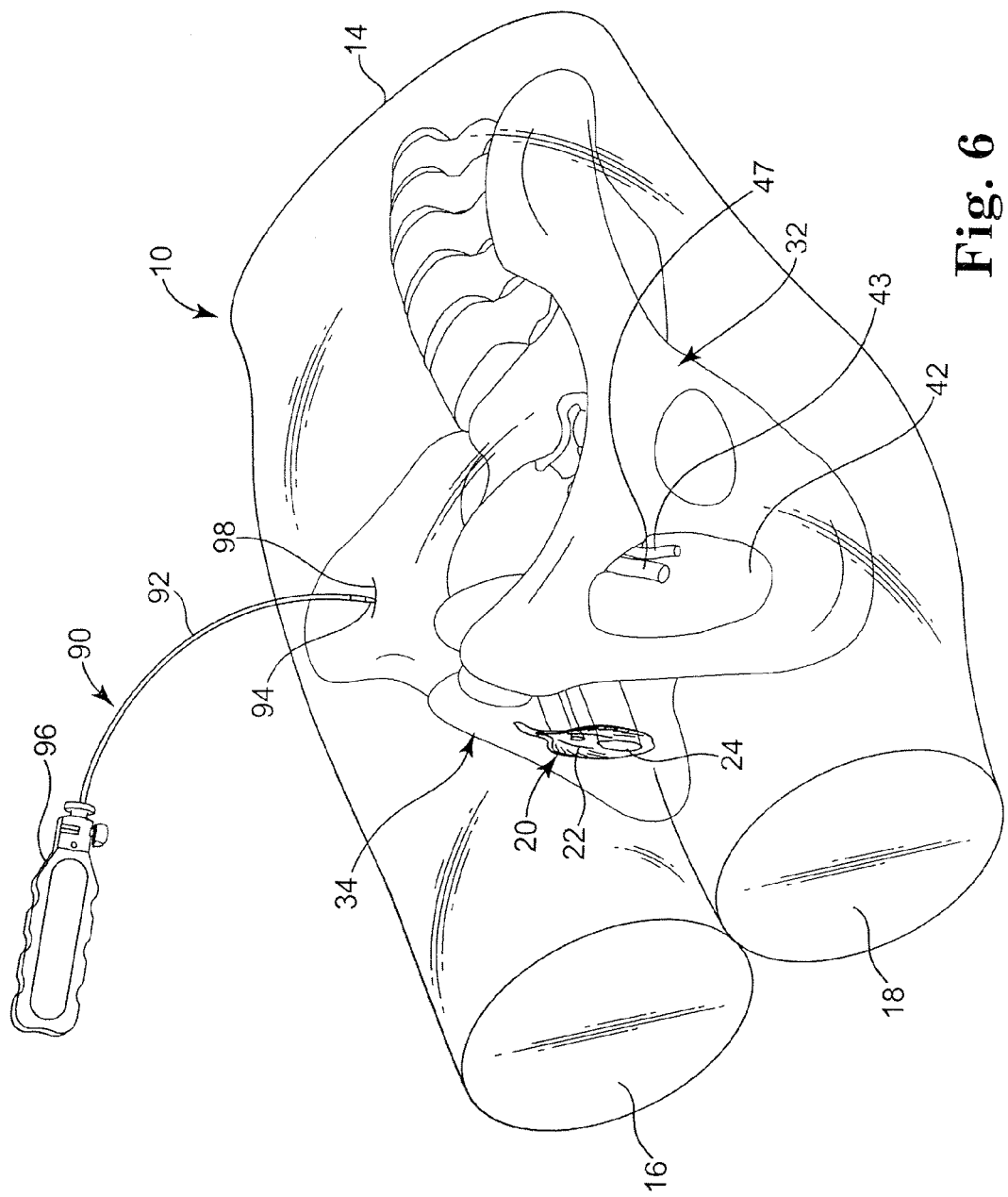
FIGS. 6 and 7 are perspective views of steps in the passage of curved needles of sling implantation tools through the external skin of the surgical training model along the posterior surface of the pubic bone to dispose the needle tip through the vaginal skin.
Figure 7:
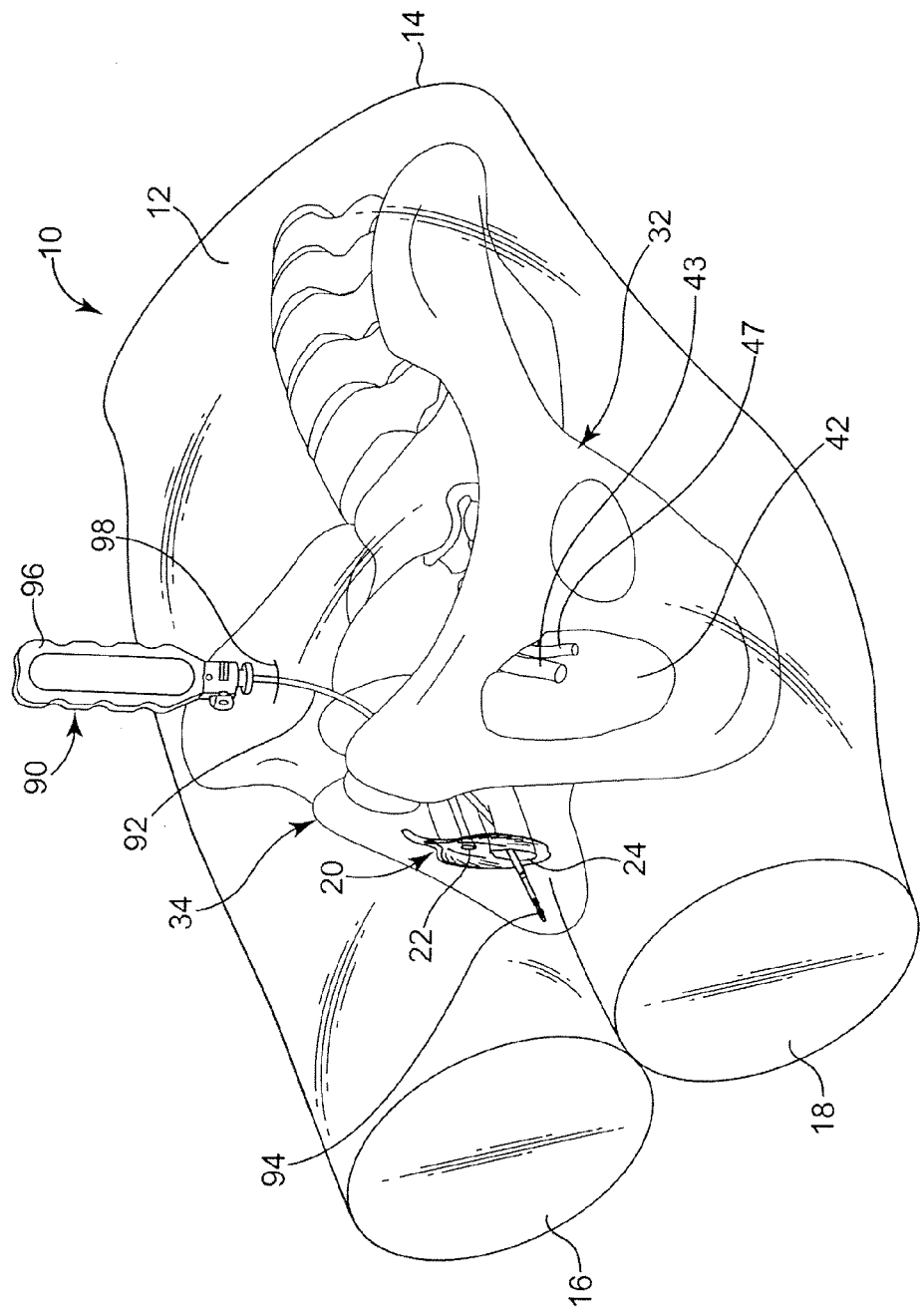

The female training model 10 may also be employed in training for the implantation of a urethral sling about the urethra 52 employing sling implantation tools having curved needles, e.g., the above-referenced BioArc™ SP and SPARC™ sling implantation tools. Such a right hand sling implantation tool 90 is depicted in FIGS. 6 and 7 being used to extend the needle tip 94 through a skin incision 98 alongside the posterior surface of the pubic bone 34 to dispose the needle tip through a vaginal skin incision in the region of the vaginal opening 24 as described in the above-referenced '977 patent.

Again, the surgeon in training may attach a urethral sling to the needle free ends and reverse the motion of the needles, e.g., needle 92, to pull the sling ends through the pathways and out of the skin incisions in the skin 12. The remaining implantation steps described above and in the above-referenced commonly assigned patents and patent applications may be practiced employing the training model 10.

Practicing manipulation of the sling implantation instruments 80 and 90 to advance the respective needles 82 and 92 through pathways in the female training model 10 allows the surgeon in training to both feel and see the advancement and the effects of making a mistake. The urethral sling may comprise a reusable model or models of any of the urethral slings employed in the procedure being practiced. Such training is therefore simplified, shortened, and less expensive than training using cadavers. Moreover, the implantation and tensioning of urethral slings can be readily demonstrated both to the prospective surgical trainee and any patient interested in being educated about such procedures.

Figure 8:
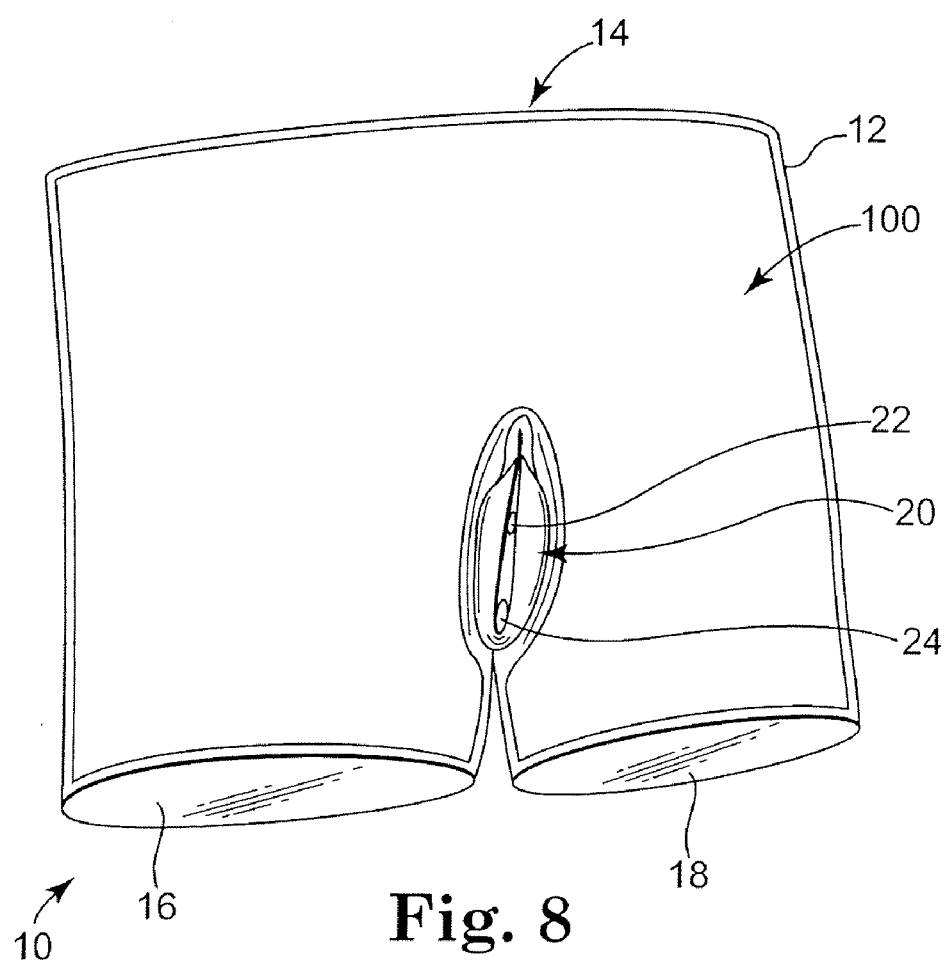
FIG. 8 is a perspective view of an opaque shield shaped to conform to and be applied over the external skin of the surgical training model to obstruct view of the internal components in repeating the training steps of FIG. 4-5 or 6-7.

As the training progresses, it may be desirable to mask the interior components of the female training model 10 from view to test the trainee's performance. Consequently, a shell 100 of opaque, penetrable, polymer material as shown in FIG. 8 may be provided to fit over at least a portion of the exterior skin 12 of the female training model 10 to obstruct the internal components from view. The shell 100 may be elastic, and the trainee may make an incision through it large enough to pass the needle tip 84, 94 and needle 82, 92 of the implantation tool 80, 90 through the female training model 10 as shown in FIG. 4-5 or 6-7.

Figure 9:
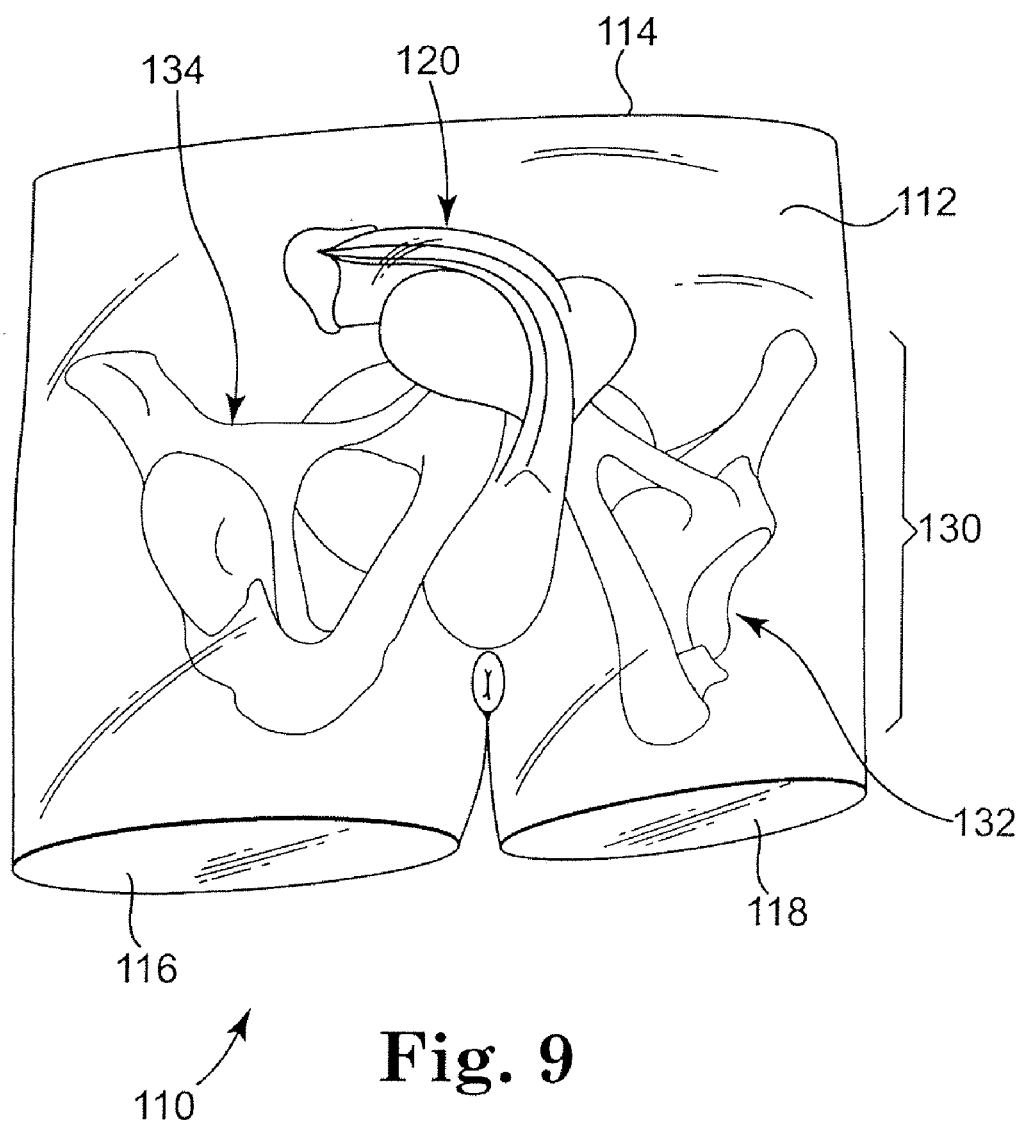
FIG. 9 is a perspective view of the exterior of a surgical training model of the male abdominopelvic region depicting the skin and the male external genitals.
Figure 10:
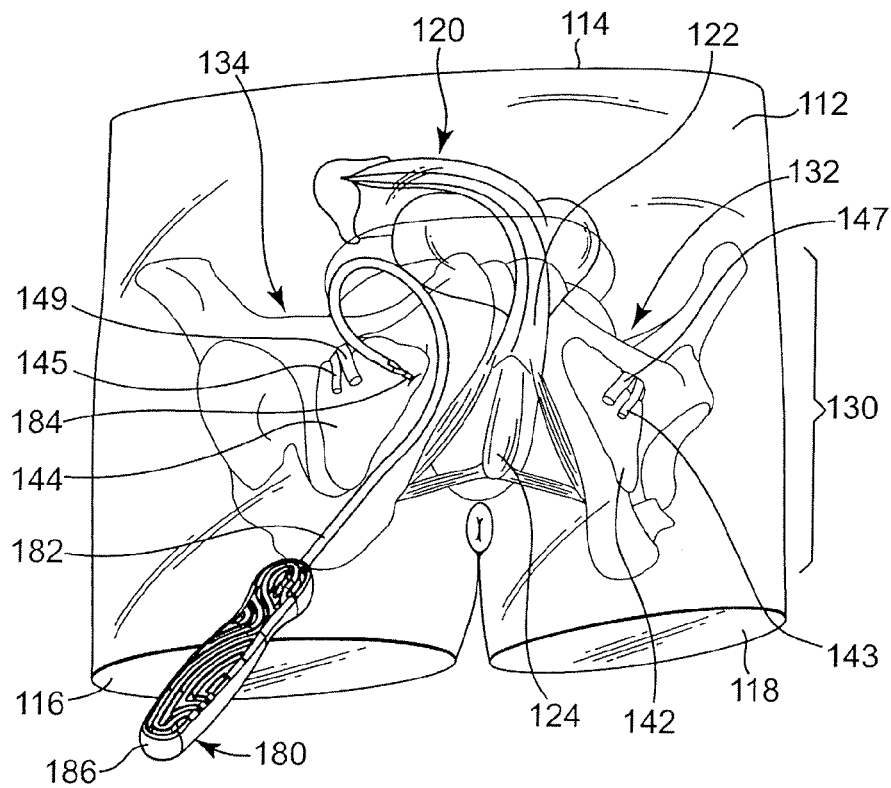
FIGS. 10 and 11 are perspective views of steps in the passage of helical needles of sling implantation tools through the external skin of the male surgical training model around pubic bones and through transobturator membranes to dispose the needle tip in operative relation to the male urethra.
Figure 11:
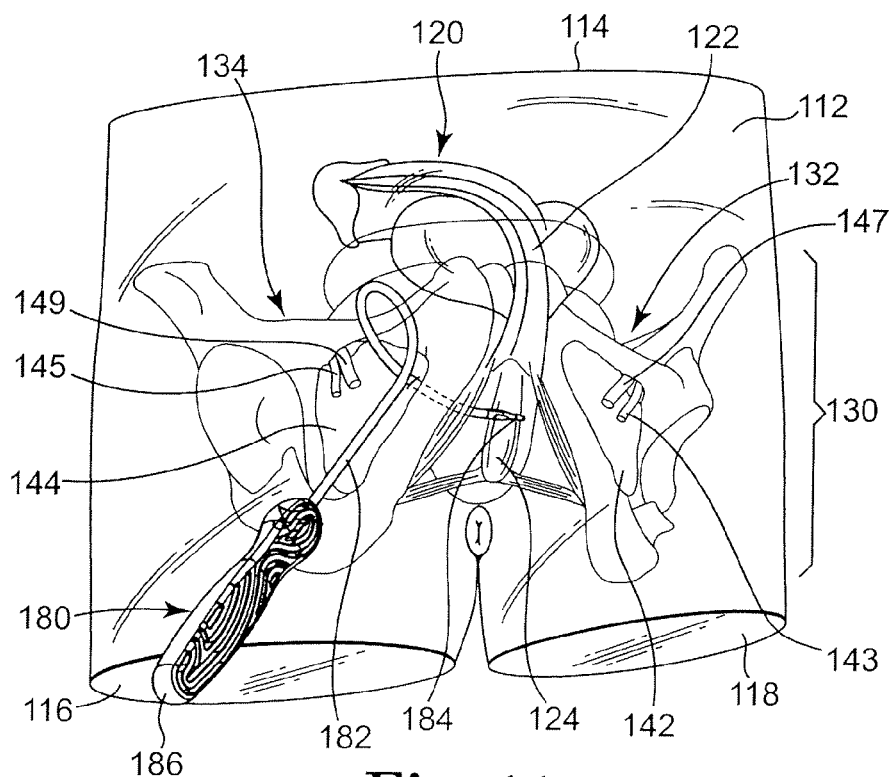

A similar male training model 110 is depicted in FIGS. 9-11 for training in the implantation of a urethral sling in a TO approach to dispose the sling support portion below the male urethra. Thus, the male training model 110 is formed of a substantially transparent mass of elastomer and anatomically correct, tinted polymer components in the manner of the female training model 10 described above. The male training model 110 of the abdominopelvic region extends between the abdominal end 114 to the left and right leg ends 116 and 118 and includes an anatomically correct model of the male external genitalia 120.

Certain of the male training model internal components, notably the rigid skeletal frame 130, the right and left coxal bones 32 and 34 and the right and left transobturator membranes 142 and 144 are visible through the transparent elastomer mass within skin 112. The transobturator nerves 143 and 145 and transobturator arteries may also be represented by tubular models traversing the transobturator membranes 142 and 144.

The male urethra 122 comprises three portions, namely the prostatic, bulbar, and pendulus portions. The prostatic portion passes through the prostate gland and is the widest. The model of urethra 122 is preferably formed of a tube that is tinted to be visible through the skin 112. In a male patient, the urethral sling may be placed proximate, but not in contact with the bulbar urethra. An incision through skin 112 in the perineal region of the male training model 110 inferior to the male urethra 122 may be represented to expose the region of the bulbar urethra 124.

In use, the surgical trainee is able to palpate the male training model 110 and practice manual advancement of the elongated needles of surgical or medical instruments, for example, right and left handed sling implantation tools, from one of a selected simulated suprapubic skin incision of the anterior skin surface overlying the tubular urethra 52 and passed through the respective right and left penetrable membranes 42 and 44 in any of the ways described above. For example, FIGS. 10 and 11 depict steps in the passage of a helical needle 182 of a left hand sling implantation tool 180 through the external skin 112 of the male training model 110 around the pubic bone 134 and through the transobturator membrane 144 to dispose the needle tip 184 at the simulated incision site exposing the region of the bulbar urethra 124 thereby forming a left hand sling implantation pathway. It will be understood that a similar procedure is employed using a right hand sling implantation tool to form a left hand sling implantation pathway. It will be understood that the training model 110 and the helical needle 192 or needles may be supplied together as a training kit.

In reference to FIGS. 10 and 11, the needle 182 is sized and shaped so that the distal end 184 may initially be moved through an abdominal incision and advanced posterior to one of the right and left posterior ischiopubic pubic ramus of the pelvic girdle spaced from the bladder 156. The needle 182 is curved in three-dimensional space so that the needle tip 184 may be advanced toward and through the obturator membrane 144 of the obturator foramen, and then toward the simulated incision exposing the region of the bulbar urethra 124.

In this procedure, the surgeon employs a learned wrist motion of the hand grasping the handle 186 and pressure feedback felt through the handle 186 to guide such advancement while avoiding damage to the bladder and any blood vessel or nerve in the path of advancement. The surgeon may palpate the incision at the region of the bulbar urethra 124 with the fingers of the free hand to locate the needle tip 184 and guide it toward and through the incision to expose the needle tip 184 as shown in FIG. 11. The procedure is repeated using the other of the right and left hand sling implantation tools to advance the needle tip through a second skin incision and the other of the respective right and left obturator membranes 142 and 144 to expose both needle tips through or at the simulated incision at exposing the region of the bulbar urethra 124.

Then, the surgeon in training may attach a urethral sling to the needle free ends and reverse the motion of the needles, e.g., needle 182, to pull the sling ends through the TO pathways and out of the skin incisions in the skin 112. The remaining implantation steps described above and in the above-referenced commonly assigned patents and patent applications may be practiced employing the male training model 110.

In this regard, it should be noted that the male training model 110 may also be employed in the training of the implantation tools and the male urethral slings described and depicted in the above-referenced commonly assigned '450 patent.

It will be understood that the male training model 110 may include any of the internal components described above with respect to the female training model 10, and that an opaque shell similar to shell 100 may be provided to aid in training the surgical trainee.

The male and female training models 10 and 110 may also comprise tubular members representing one or more of the superficial epigastric vessel, the inferior epigastric vessel, the external iliac artery and the internal iliac artery extending in substantially physiologic relation to the skeletal frame disposed within the mass of elastomer;

Thus, the above-described male and female training models 10 and 110 may be supplied in sufficient additional anatomic detail to facilitate surgical training in correction of other conditions within the abdominopelvic region than described above that accompany aging or trauma or disease processes. Procedures that address problems other than incontinence (e.g. cystocele, enterocele or prolapse) are also contemplated alone or in conjunction with the present invention. Further, the term "urethra," with respect to sling positioning, is used for brevity and reader convenience. It should be noted that the present invention is particularly suitable for placing a sling in a therapeutically effective position. The method may be utilized to support a variety of structures at different anatomical locations. As such, the terms "target site," "bladder", "urethro-vesical juncture", "vaginal vault", "U-V juncture" and "bladder neck" are also included within the scope of the present invention.

For example, the surgical models may include representations of abnormalities in tissue layers and organ models that can be employed in training in the treatment of prolapse, rectocele, cystocele, enterocele, or protocele, particularly employing minimally invasive instruments. The training models may enable surgeons to practice passing instruments about or into the proper relation to the damaged organ or tissue to implant a sling or perform a corrective procedure.

By way of definition, a prolapse comprises the slipping of an organ, or organ part, from its normal position to an abnormal position. Prolapse of the rectum comprises the protrusion of the rectum through the anus, and rectocele is the prolapse of the rectum into the perineum. Prolapse of the uterus comprises the protrusion of the uterus into the vagina due to stretching and laxity of uterine supporting structures. Prolapse of the cephalad extreme of the vaginal wall toward, through, and beyond the introitus, is referred to as vaginal vault prolapse. The abnormal descent of the anterior vaginal wall and bladder base at rest or with strain is referred to as cystole. Vesicocele is a form of cystole and more particularly comprises a hernia caused by the downward and backward displacement of the urinary bladder toward the vaginal orifice, due most commonly to weakening of the musculature during childbirth. Enterocele is a hernia of the intestine, though the term is also used to refer specifically to herniation of the pelvic peritoneum through the rectouterine pouch (i.e., posterior vaginal, rectovaginal, cul-de-sac, or Douglas' pouch hernia). Proctocele is a prolapse of the mucous coat of the rectum due mostly from relaxation of the sphincter. Treatment of these conditions frequently requires obtaining access to the organ or tissue, restoring proper position, and implanting a sling to maintain the proper position.

In other various embodiments, the training model includes simulated pelvic floor muscles and a rectal canal (and rectum) to train on the implantation of rectal/fecal incontinence slings as well as meshes for pelvic floor support. Incisions may be limited to a single perineal, medial or vaginal incision and the needle pass is made up to and optionally through the obturator foramen internus and externus membrane (or only the internus) and through the skin or stops before exiting the body All patents and publications referenced herein are hereby incorporated by reference in their entireties. It will be understood that certain of the above-described structures, functions and operations of the above-described preferred embodiments are not necessary to practice the present invention and are included in the description simply for completeness of an exemplary embodiment or embodiments. It will also be understood that there may be other structures, functions and operations ancillary to the typical surgical procedures that are not disclosed and are not necessary to the practice of the present invention.

The invention claimed is:

1. A surgical training model of the abdominopelvic region of a human patient's body to assist in training an operator in directing minimally invasive surgical instruments through body tissue comprising:
    a relatively rigid skeletal frame shaped in conformance with at least a portion of the human pelvic girdle comprising at least portions of the right and left coxal bones each including a substantially realistic representation of at least the ischium and pubis, including the superior pubic ramus and the posterior ischiopubic pubic ramus joined at the interpubic disc, the skeletal frame defining right and left obturator foramens;
    a component model of a body tissue comprising at least one of a body organ, muscle group, membrane, ligament, blood vessel, or nerve in substantially correct anatomic shape, size and relation to the skeletal frame; and
    a mass of elastomer encasing the component model and the skeletal frame having a flexibility, density and consistency mimicking that of tissues of the human body.

2. The training model of claim 1, wherein the mass of elastomer is configured having an external surface and shape representative of a substantially anatomically correct human female.

3. The training model of claim 1, wherein the mass of elastomer is configured having an external surface and shape representative of a substantially anatomically correct human male.

4. The training model of claim 1, wherein at least a portion of the mass of elastomer is substantially transparent.

5. The training model of claim 4, wherein the skeletal frame and component model are tinted to be visible within the mass of elastomer.

6. A surgical training model of the abdominopelvic region of a human patient's body to assist in training an operator in implantation of a pelvic sling or mesh to support any one of a rectum, urethra and pelvic floor, the implantation including the advancement of a shaped needle of a sling implantation tool via at least one medial or vaginal incision and optimally between right and left surgical skin incisions overlying the patient's respective right and left obturator foramen and respective right and left sites in a pelvic floor region to form a subcutaneous passage for the sling transversely across a portion of the urethra to simulate normal pubourethral ligament support, the sling implantation tool comprising a handle and an elongated needle coupled at a needle proximal end to the handle and extending in a curvature through two-dimensional and/or three-dimensional space to a needle distal end, the surgical model comprising:
    a relatively rigid skeletal frame shaped in conformance with at least a portion of the human pelvic girdle comprising at least portions of the right and left coxal bones each including a substantially realistic representation of at least the ischium and pubis, including the superior pubic ramus and the posterior ischiopubic pubic ramus joined at the interpubic disc, the skeletal frame defining right and left obturator foramens;
    a penetrable membrane extending substantially across at least one of the right and left obturator foramens and having a membrane puncture resistance selected to mimic the puncture resistance of the native human obturator membrane to puncture by the needle distal end;
    a mass of elastomer encasing the skeletal frame having an external shape substantially representative of the external appearance of the human abdominopelvic region including superficial features of posterior skin overlying the pubis and the body overlying the tubular member representing the urethra, the elastomer selected to present a resistance to passage of the elongated needle substantially corresponding to the resistance to passage of the elongated needle presented by the native human subcutaneous connective and muscle tissues in the abdominopelvic region adjacent the pelvic girdle; and a member shaped to represent one of the rectum, urethra and pelvic floor muscles extending in substantially physiologic relation to the skeletal frame disposed within the mass of elastomer, whereby the surgical trainee is able to palpate the surgical model and practice manual advancement of the elongated needle of the sling implantation tool from one or more selected simulated skin incision of the anterior skin surface and the body overlying the tubular urethra model through one or both of the respective right and left penetrable membranes and along the respective right and left posterior ischiopubic pubic ramus of the skeletal frame.

7. The surgical training model of claim 6, wherein the mass of elastomer is sufficiently transparent to enable viewing of the passage of the elongated needle therethrough.

8. The surgical training model of claim 7, further comprising an opaque cover adapted to be disposed over the mass of elastomer to selectively block viewing of the passage of the elongated needle therethrough.

9. The surgical training model of claim 7, further comprising a bladder model shaped to represent a human bladder disposed within the mass of elastomer in anatomically correct relation to the urethra model and the portion of the human pelvic girdle and disposed therefrom to enable passage of the elongated needle thereby.

10. The surgical training model of claim 7, further comprising at least one tubular member representing one or more of the obturator nerves, the obturator arteries, the superficial epigastric vessel, the inferior epigastric vessel, the external iliac artery and the internal iliac artery extending in substantially physiologic relation to the skeletal frame disposed within the mass of elastomer.

11. The surgical training model of claim 6, wherein each rectum, urethra and pelvic floor muscle member is selectively colored to be visible in outline through the transparent mass of elastomer.

12. The surgical training model of claim 7, wherein the elastomer mass is shaped to resemble the male anatomy and the rectum, urethra and pelvic floor muscle members terminate in a representation of the superficial features of the male genitalia.

13. The surgical training model of claim 9, wherein the bladder model is made of a material that is impenetrable by the needle distal end to guide the needle distal end between the bladder and the right or left pubic rami.

14. A surgical training method for training an operator in implantation of a pelvic sling to support any one of a rectum, urethra and pelvic floor muscle, to comprising:

providing a model of the abdominopelvic region of a human patient's body comprising:

a relatively rigid skeletal frame shaped in conformance with at least a portion of the human pelvic girdle comprising at least portions of the right and left coxal bones each including a substantially realistic representation of at least the ischium and pubis, including the superior pubic ramus and the posterior ischiopubic pubic ramus joined at the interpubic disc, the skeletal frame defining right and left obturator foramens;

a component model of a body tissue comprising at least one of a body organ, muscle group, membrane, ligament, blood vessel, or nerve in substantially correct anatomic shape, size and relation to the skeletal frame; and a mass of elastomer encasing the component model and the skeletal frame having a flexibility, density and consistency mimicking that of tissues of the human body; and determining an incision site of the model for a simulated pelvic incision; and manually advancing an elongated surgical instrument from at least one selected simulated pelvic incision through the mass of elastomer and to at least one obturator foramen to form a pathway.

15. A surgical training method for training an operator in implantation of a urethral sling to support the urethra to comprising:

providing a model of the abdominopelvic region of a human patient's body comprising:

a relatively rigid skeletal frame shaped in conformance with at least a portion of the human pelvic girdle comprising at least portions of the right and left coxal bones each including a substantially realistic representation of at least the ischium and pubis, including the superior pubic ramus and the posterior ischiopubic pubic ramus joined at the interpubic disc, the skeletal frame defining right and left obturator foramens;

a penetrable membrane extending substantially across at least one of the right and left obturator foramens and having a membrane puncture resistance selected to mimic the puncture resistance of the native human obturator membrane to puncture by the needle distal end;

a mass of elastomer encasing the skeletal frame having an external shape substantially representative of the external appearance of the human abdominopelvic region including superficial features of posterior skin overlying the pubis and the body overlying the tubular member representing the urethra, the elastomer selected to present a resistance to passage of the elongated needle substantially corresponding to the resistance to passage of the elongated needle presented by the native human subcutaneous connective and muscle tissues in the abdominopelvic region adjacent the pelvic girdle; and a tubular urethra model shaped to represent the urethra extending in substantially physiologic relation to the skeletal frame disposed within the mass of elastomer, palpating the surgical model to locate a region of the urethra; and manually advancing the elongated needle of a surgical instrument from one or more selected simulated skin incision through the one or both of the right and left penetrable membranes and along the respective right and left posterior ischiopubic pubic ramus of the skeletal frame.

16. A kit for demonstrating or training medical personnel in passing an elongated surgical instrument through the skin and the underlying tissues of the abdominopelvic region of a human patient's body comprising:

an anatomic model of the abdominopelvic region of a human patient's body comprising:
- a relatively rigid skeletal frame shaped in conformance with at least a portion of the human pelvic girdle comprising at least portions of the right and left coxal bones each including a substantially realistic representation of at least the ischium and pubis, including the superior pubic ramus and the posterior ischiopubic pubic ramus joined at the interpubic disc, the skeletal frame defining right and left obturator foramens;
- a component model of a body tissue comprising at least one of a body organ, muscle group, membrane, ligament, blood vessel, or nerve in substantially correct anatomic shape, size and relation to the skeletal frame; and
- a mass of elastomer encasing the component model and the skeletal frame having a flexibility, density and consistency mimicking that of tissues of the human body; and an elongated surgical instrument comprising an elongated needle adapted to be grasped to advance the elongated needle from selected simulated skin incisions through the mass of elastomer and one of the right and left obturator foramens to form a pathway.

* * * * *